US008799582B2

(12) United States Patent
Sheaffer et al.

(10) Patent No.: US 8,799,582 B2
(45) Date of Patent: Aug. 5, 2014

(54) EXTENDING CACHE COHERENCY PROTOCOLS TO SUPPORT LOCALLY BUFFERED DATA

(75) Inventors: Gad Sheaffer, Haifa (IL); Shlomo Raikin, Geva Carmel (IL); Vadim Bassin, Raanana (IL); Raanan Sade, Kibutz Gvat (IL); Ehud Cohen, Kiryat Motskin (IL); Oleg Margulis, Haifa (IL)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 12/346,543

(22) Filed: Dec. 30, 2008

(65) Prior Publication Data

US 2010/0169581 A1     Jul. 1, 2010

(51) Int. Cl.
*G06F 12/08*     (2006.01)
*G06F 9/38*     (2006.01)

(52) U.S. Cl.
CPC .......... *G06F 9/3834* (2013.01); *G06F 12/0831* (2013.01); *G06F 12/084* (2013.01)
USPC ..... 711/141; 711/145; 711/144; 711/E12.026

(58) Field of Classification Search
CPC ... G06F 9/3834; G06F 9/465; G06F 12/0831; G06F 12/084
USPC .................. 711/141, 144, 145, 118, E12.026
See application file for complete search history.

(56) References Cited

U.S. PATENT DOCUMENTS 6,272,602 B1 *   8/2001   Singhal et al. ................ 711/144
7,395,382 B1     7/2008   Moir
(Continued)

FOREIGN PATENT DOCUMENTS

WO    WO 2005066743 A2 *   7/2005
WO    2010/077885 A2     7/2010
WO    WO 2010/077872 A2     7/2010

OTHER PUBLICATIONS

International Search Report and Written Opinion received for PCT Application No. PCT/US2009/068121, mailed on Jul. 29, 2010, 9 pages.

(Continued)

*Primary Examiner* — Pierre-Michel Bataille
(74) *Attorney, Agent, or Firm* — Blakely, Sokoloff, Taylor & Zafman LLP

(57) ABSTRACT

A method and apparatus for extending cache coherency to hold buffered data to support transactional execution is herein described. A transactional store operation referencing an address associated with a data item is performed in a buffered manner. Here, the coherency state associated with cache lines to hold the data item are transitioned to a buffered state. In response to local requests for the buffered data item, the data item is provided to ensure internal transactional sequential ordering. However, in response to external access requests, a miss response is provided to ensure the transactionally updated data item is not made globally visible until commit. Upon commit, the buffered lines are transitioned to a modified state to make the data item globally visible.

27 Claims, 5 Drawing Sheets

(56) References Cited

U.S. PATENT DOCUMENTS

| | | |
|---|---|---|
| 8,078,807 B2 * | 12/2011 | Saha et al. .................... 711/144 |
| 8,095,824 B2 * | 1/2012 | Gray et al. ...................... 714/16 |
| 2005/0060559 A1 | 3/2005 | McKenney |
| 2005/0086446 A1 | 4/2005 | McKenney et al. |
| 2005/0091459 A1 | 4/2005 | Quach et al. |
| 2005/0160230 A1 | 7/2005 | Doren et al. |
| 2005/0160232 A1 | 7/2005 | Tierney et al. |
| 2007/0239942 A1 | 10/2007 | Rajwar et al. |
| 2008/0209133 A1 | 8/2008 | Ozer et al. |
| 2009/0113443 A1 * | 4/2009 | Heller, Jr. et al. ............. 718/106 |
| 2009/0172292 A1 * | 7/2009 | Saha et al. .................... 711/135 |
| 2010/0122073 A1 * | 5/2010 | Narayanaswamy et al. .. 712/244 |
| 2010/0153953 A1 * | 6/2010 | Adl-Tabatabai et al. ..... 718/101 |
| 2010/0169581 A1 * | 7/2010 | Sheaffer et al. ............... 711/141 |
| 2011/0145516 A1 * | 6/2011 | Adl-Tabatabai et al. ..... 711/152 |

OTHER PUBLICATIONS

International Preliminary Report on Patentability received for PCT Application No. PCT/US2009/068121, Mailed on Jul. 14, 2011, 6 pages.

International Search Report and Written Opinion received for PCT Application No. PCT/US2009/068081, mailed on Jul. 27, 2010, 7 pages.

International Preliminary Report on Patentability received for PCT Application No. PCT/US2009/068081, mailed on Jul. 5, 2011, 5 pages.

First Office Action for Chinese Patent Application 200910261800.8, mailed Aug. 17, 2012, 6 pages.

Second Office Action for Chinese Patent Application 200910261800.8, mailed Mar. 22, 2013, 13 pages.

* cited by examiner

303. Flush or Invalidate
304. Store or Load lock hit to E
305. GO2S snoop Probe hitting E
306. Flush, invalidate or Snoop Probe GO2I hit to E.
307. Store or loadlock hit to S, GO2I snoop probe hit to S. Flush or Invalidate 310. transactional store
311. Discard
312. Commit
313. Transactional store to a modified line

EXTENDING CACHE COHERENCY PROTOCOLS TO SUPPORT LOCALLY BUFFERED DATA

FIELD

This invention relates to the field of processor execution and, in particular to execution of groups of instructions.

CROSS REFERENCE TO RELATED APPLICATIONS

This application is related to the following patent applications filed herewith: U.S. patent application Ser. No. 12/346,518, entitled "Registering a User-Handler in Hardware for Transactional Memory Event Handling," by Gad Sheaffer et al., filed on Dec. 30, 2008; U.S. patent application Ser. No. 12/346,539 (now U.S. Pat. No. 8,627,014), entitled "Memory Model for Hardware Attributes Within a Transactional Memory System," by Gad Sheaffer et al., filed on Dec. 30, 2008; U.S. patent application Ser. No. 12/346,530 (now U.S. Pat. No. 8,627,017), entitled "Read and Write Monitoring Attributes in Transactional Memory (TM) Systems," by Gad Sheaffer et al., filed on Dec. 30, 2008; U.S. patent application Ser. No. 12/346,500, entitled "Metaphysical Address Space for Holding Lossy Meta-data in Hardware," by Gad Sheaffer et al., filed on Dec. 30, 2008.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware.

Another type of transactional execution includes a Hardware Transactional Memory (HTM) System, where hardware is included to support access tracking, conflict resolution, and other transactional tasks. Previous HTMs have utilized separate write buffer structures to buffer transactional writes to memory locations. However, the addition of a separate buffer potentially adds cost and complexity to a processor, as well slows a transaction commit process.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for transactional execution, specific types and implementations of access monitors, specific cache implementations, specific types cache coherency models, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, specific compiler methods/implementations, and specific operational details of microprocessors, have not been described in detail in order to avoid unnecessarily obscuring the present invention.

The method and apparatus described herein are for extending cache coherency to support buffered data. Specifically, extending cache coherency is discussed in reference to a hardware transactional memory system. However, the methods and apparatus for supporting buffered data is not so limited, as they may be implemented for any style of execution to support buffered data.

Figure 1:
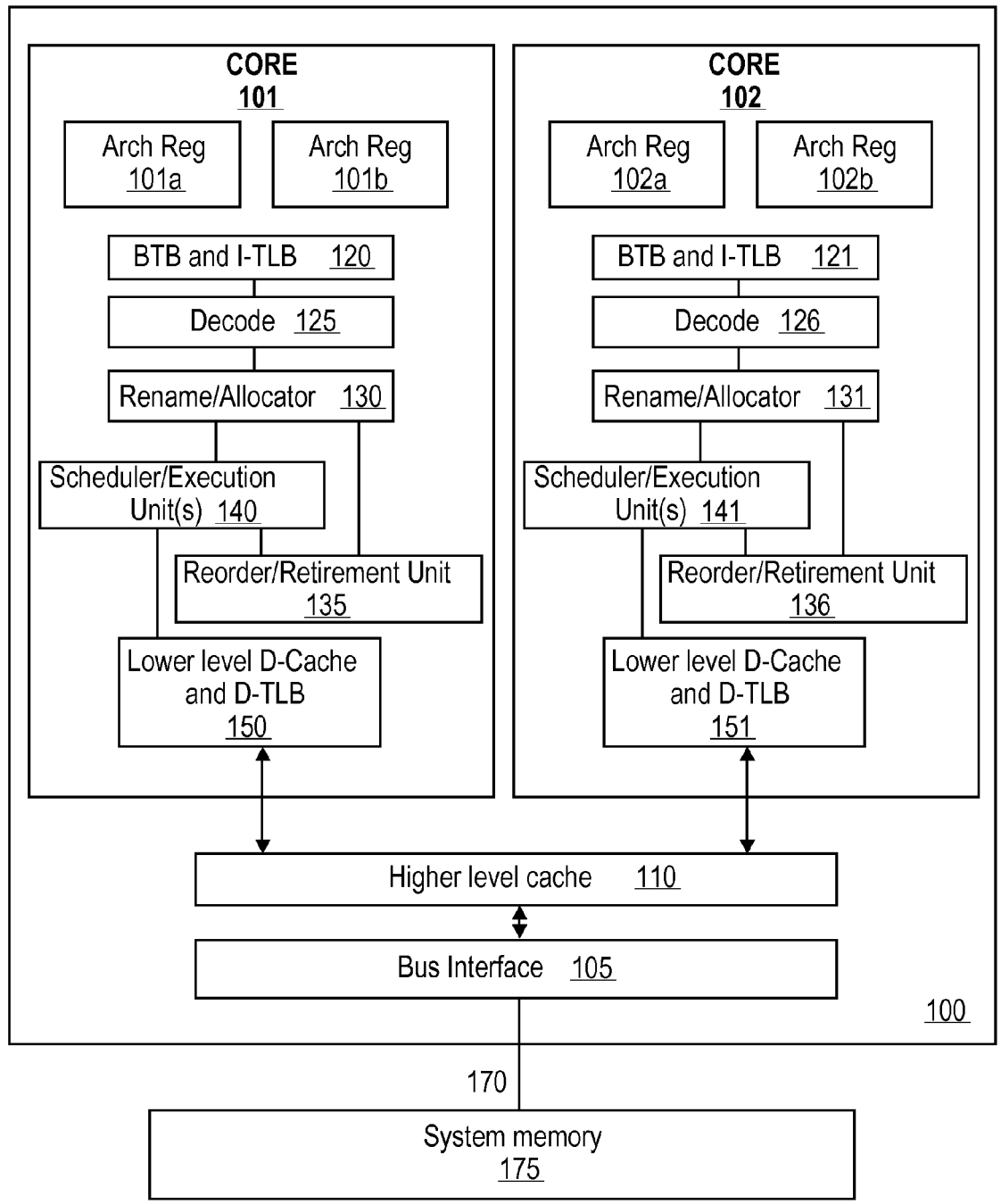
FIG. 1 illustrates an embodiment of a processor including multiple processing elements capable of executing multiple software threads concurrently.

Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a Software Transactional Memory (STM), separate execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 110b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly langue include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

Accesses and requests may be made to data items both by local processing elements, as well as potentially by other processing elements. Without safety mechanisms in a transactional memory system, some of these accesses would potentially result in invalid data and execution, i.e. a write to data invalidating a read, or a read of invalid data. As a result, processor 100 potentially includes logic to track or monitor memory accesses to and from data items for identification of potential conflicts.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, monitors include read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately. An example of utilizing read monitors/attributes to monitor data items is discussed in more detail in application Ser. No. 12/346,530 (now U.S. Pat. No. 6,627,017), entitled "Read and Write Monitoring Attributes in Transactional Memory (TM) Systems," by Gad Sheaffer et al., filed herewith. However, monitors, attributes, annotations, or other tracking mechanisms may be utilized to detect conflicts associated with transactional execution utilizing any granularity of data or structures to hold the data.

Note that traditional MESI states may be augmented and/or replaced with buffered states, such as an unmonitored buffered state, a write monitored buffered state, a read monitored buffered state, or other buffered state. As a result, existing known coherency and communication/snoop protocols may be utilized in combination with hardware monitors/attributes to detect conflicts. Extension of the traditional MESI coherency states to hold buffered data is described in more detail below.

Based on the design, different combinations of cache coherency requests and monitored coherency states of cache lines result in potential conflicts, such as a cache line holding a data item being in a shared read state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting.

In one embodiment, a cache coherency protocol is extended to include a buffered state to support locally buffered data. Therefore, transactional stores may be performed in a buffered manner utilizing existing cache structures instead of utilizing complex extra write buffering circuitry. As an example of an implementation design choice, an HTM may operate in a buffered update-in-place manner. In an update-in place HTM, transactional writes are performed to referenced memory addresses to modify previous data held therein. However, this modified data is not provided to external requesting threads, i.e. the data is not made globally visible, but is provided to local reads for local memory ordering purposes. Additionally, the previous data is often "logged," such that upon an abort of the transaction, the previous data is capable of being restored to achieve the state of the thread before execution of the transaction begun.

To illustrate, assume data cache 150 of processor 100 in FIG. 1 includes a first level data cache to hold data from higher level memory, such as cache 110 and system memory 175. Therefore, upon encountering a transactional write to data cache 150, a previous modified data item, in one embodiment of a write-back cache, is written back to higher level cache 110. Alternatively, the previous data may be logged in another separate memory within processor 100 or external thereto. Here, the buffered line may be lost, so a previous modified line is retained. Upon a write-back, in one embodiment, the higher level cache is informed that the data item is still being used, such that the higher level memory still forwards snoop requests to cache 150. After logging the previous data item, the transactional write is performed in a "buffered" manner to update the data item in cache 150. As a result, a cache line, or multiple cache lines, which holds the data item is/are moved to a buffered state.

Therefore, a local thread, such as local thread 110a, i.e. a thread that is associated with the transactional write, may read the modified data item from cache 150. In other words, the buffered or private data item is internally visible to the local thread, i.e. local thread 101a, to ensure sequential consistency. However, another thread, such as thread 102b, is not provided the buffered data. Essentially, the buffered write is not externally visible to other threads until the transaction commits. When the transaction commits, the logged data is invalidated or disregarded, while the buffered data is transitioned to the modified state. This transition results in global visibility of the data item to other threads, such that a subsequent external access request for the data item is provided a HIT Modified (HITM) response due to the data item being held in a modified coherency state. In contrast, if the transaction aborts, the previous data is restored as the valid data, while the buffered data is invalidated.

If the data item is evicted from cache 150 while in the buffered state, then the privately held data item is potentially lost. Essentially, the data item is not written back to higher level memory. In a scenario where data decays, i.e. lost upon an eviction or other event, a potential conflict may be triggered in a similar manner to detecting a potential access conflict, as described above.

In one embodiment, a handler is registered in hardware to support efficient handling of loss of buffered data due to conflicts or capacity. As an example, a register is modifiable by software, such as transactional runtime or application code, to register an address of a transaction handler. When an event of interest, such as a loss of information described above, is detected, then in one embodiment, the control flow is vectored to the transactional handler registered in the register without intervention of privileged software, such as an Operating System (OS). A version of registering a handler in hardware is discussed in a related application filed herewith having U.S. patent application Ser. No. 12/346,518 entitled "Registering a User-Handler in Hardware for Transactional Memory Event Handling," by Gad Sheaffer et al.

Figure 2:
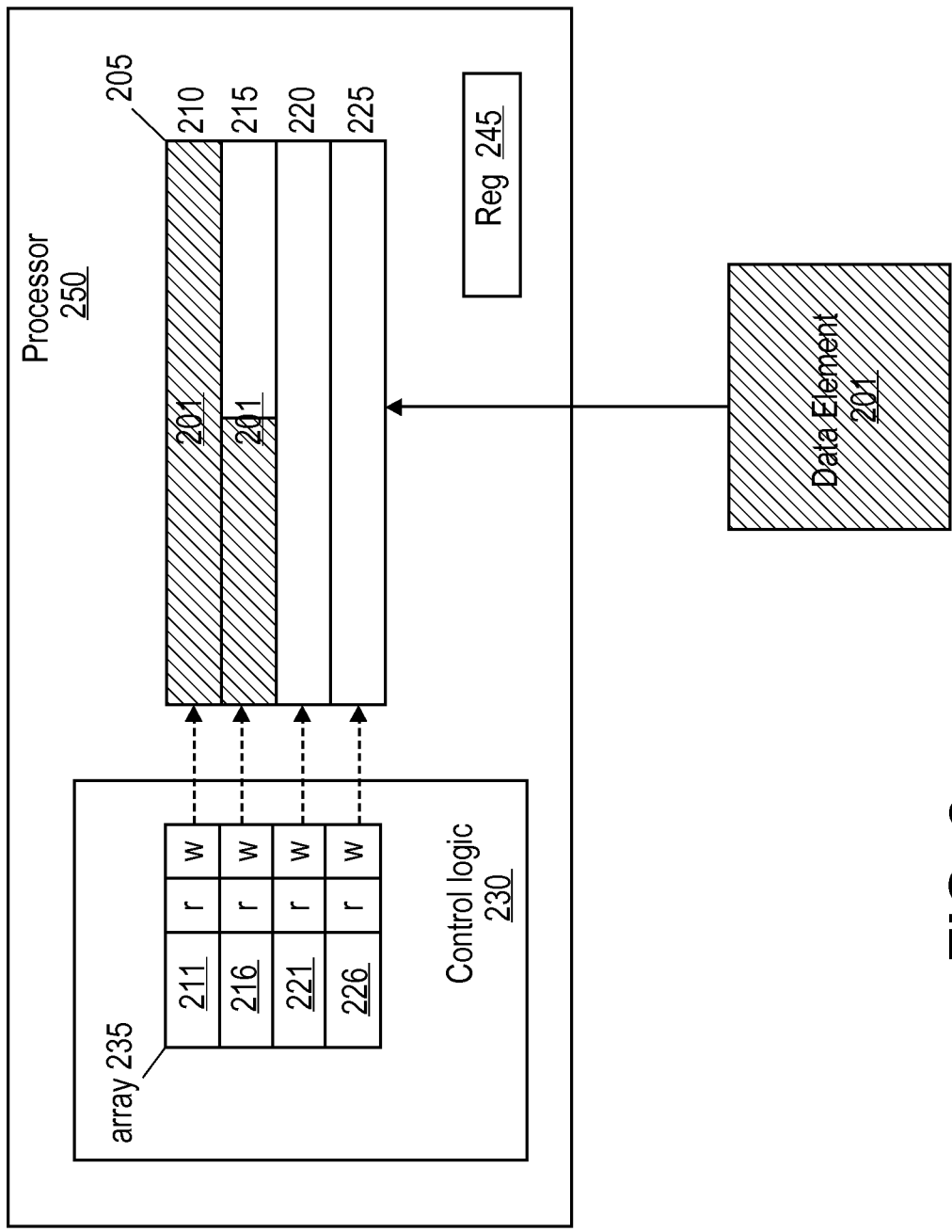
FIG. 2 illustrates an embodiment of associating a coherency state with a data item held in a cache memory is illustrated.

Referring to FIG. 2, an embodiment of associating a coherency state with a data item in a cache memory is illustrated. Processor 250 includes any type of known processor with any number of processing elements capable of transactional execution. Although not illustrated, processor 205 may be coupled to other system components, such as a chipset, i.e. memory controller hub and input/output (I/O) controller hub, and system memory. Common examples of I/O devices in a computer system include a network controller, a video display adapter, a graphics processor, an audio controller, or other input/output device.

In one embodiment, processor 250 includes a cache memory. The most relevant example of a cache includes a data cache, such as a first level cache or second level cache as illustrated in FIG. 1. However, a cache may also include an instruction cache, trace cache, or other known cache. Although cache architecture is not described in detail to avoid unnecessarily obscuring the discussion, a cache may be organized in numerous ways. For example, a cache may be fully associative, i.e. memory addresses may be held anywhere in the cache, a set associative cache where certain ranges of memory addresses are restricted to specific sets of the cache, or a direct mapped cache where multiple addresses are to be held in single locations within the cache. Note that the methods and apparatus described herein may be implemented with any cache organization.

As illustrated, the cache includes data portion 205, which may also be referred to as cache memory or a data array, and control logic 230 associated with cache memory 205. Cache memory 205 includes lines 210, 215, 220, and 225. Control logic 230 includes array 235 having entries 211, 216, 221, and 226 associated with/corresponding to cache lines 210, 215, 220, and 225, respectively. Furthermore, hardware read and write monitors 211r, 211w, 216r, 216w, 221r, 221w, 226r, and 226w are similarly associated with cache lines 210, 215, 220, and 225. Although hardware monitors and their various embodiments are described in more detail within a co-pending application field herewith having Ser. No. 12/346,530, entitled "Read and Write Monitoring Attributes in Transactional Memory (TM) Systems," by Gad Sheaffer et al., an embodiment of read and write monitors is discussed herein to further the discussion of buffering states.

In one embodiment, read and write monitors bound monitoring of data, such as data item 201, despite a granularity of the physical structures to hold the data. Note from the discussion above that a data item may have any granularity, and the starting address may be unaligned to the size of the data item. In fact, a programmer may define a data item by providing a starting address and then a number of additional bytes that make up the data item. As a result, the data item may be smaller than a line of cache 205, the size of a cache line of cache 205, or bigger than a cache line of cache 205, as well as potentially unaligned with the starting and ending boundaries of a cache line of cache 205.

In the example of FIG. 2, data item 201 spans two cache lines, including data in all of cache line 210 and half of cache line 215. Although Ser. No. 12/346,530 discusses potential dynamic assignment of monitoring attributes, attributes 211r, 211w, 216r, 216w, 221r, 221w, 226r, and 226w are provided on a cache line basis. Therefore, if data item 201 is to be write monitored, then both read monitor 211r and 216r are updated to a monitored state to indicate corresponding cache lines 210 and 215 are read monitored. Even though line 215 only holds a portion of data item 201, instead of not updating monitor 216r and not monitoring the portion of data item 201 in line 215, 216r is set to monitor all of line 215, i.e. more data is included to ensure consistency of data item 201. In other words, data item 201 is bounded by monitoring despite the cache line granularity of monitors illustrated in FIG. 2.

In one embodiment, array 235 includes a coherency state array including entries 211, 216, 221, and 226. As illustrated, monitors 211r, 211w, 216r, 216w, 221r, 221w, 226r, and 226w are part of state array 235, which essentially results in extension of coherency states held in entries 211, 216, 221, and 226 to include read monitored, write monitored, and unmonitored states. Although inclusion of read and write monitors in state array 235 is illustrated, for the purpose of simplifying the discussion below, extension of coherency states to include a buffered state is discussed separately from read and write monitoring states. In fact, in another example, read and write monitors are not included in state array 235, but rather associated with data in another manner, such as annotated within each cache line, held in another array, or dynamically assigned to data items.

Therefore, in one embodiment, array 235 including entries 211, 216, 221, and 226 are to hold cache coherency state values corresponding to cache lines 210, 215, 220, and 225, respectively. Common cache coherency states include MESI, i.e. Modified Exclusive Shared and Invalid, cache coherency states. Here, a buffered state is added to the MESI state to form a MESIB protocol. Any known values to represent a state may be held in state entries, such as entry 211 and 216. For example, a bit vector is included within each state entry, where each bit corresponds to a coherency state. As another example, state entries hold encoded values to represent coherency states.

As yet another example, a buffering monitor/attribute may be added in a similar fashion to the read and write monitors described above, which essentially results in a new buffered coherency state. Furthermore, in one embodiment, buffering may be independent and orthogonal to read and write monitoring with new buffering coherency rules. For example, buffering may not allow write sharing. i.e. external writes invalidate a buffered line, but buffering does allow read sharing, i.e. a buffered line in one cache does not collide with a shared line a different cache. In a scenario where read sharing is allowed, then some coherency action is taken to ensure reads are valid before commit, such as invalidating all shared copies of data in other caches.

When a transactional buffered store operation, or other store operation identified for buffering, is encountered, the buffered store operation is performed. Determining whether a store operation, such as a transactional store operation, is to be buffered is discussed in more detail below in reference to FIG. 4. However, in addition to performing the store, the coherency state of the associated line is updated to a buffered state for stores determined to be buffered. In one embodiment, a data item is buffered in a bounded manner despite a granularity of underlying storage structures.

To illustrate, assume a transactional store to data element 201 is encountered. According to a MESI protocol, control logic 230 performs a read-for-ownership request, which is similar to a normal write operation. When ownership is gained, data element 201 is written and associated with a buffered coherency state. In this example, both lines 210 and 215 hold at least some portion of data element 201, so the lines are transitioned to a buffered coherency state. Taking a specific look at cache line 215, corresponding state entry 216 is updated to a buffered state value to indicate cache line 215, and the portion of data item 201 held therein, is in a buffered coherency state. It may also be said that data item 201 and/or line 215 is associated with a buffered coherency state.

As referred to above, a write monitor associated with cache line 215 may also be updated to indicate the cache line is write-monitored. In one embodiment, a hardware write attribute, such as attribute 216w, is separately applied in response to the transactional store operation. In other words, these updates may be referred to as write monitored buffered updates, i.e. addresses/data updated in a buffered fashion and write monitoring was applied. Often, a conflict is detected at the time when an external agent attempts to update write monitored buffered data.

Similarly, in response to a transactional read of cache line 215, hardware read monitor 216r may be set to indicate cache line 215 is read monitored. Again, these updates may be referred to as read monitored buffered updates, i.e. updates made in a buffered fashion with read monitoring applied. Here, addresses may be locally updated in parallel, and conflict resolution, if any, is deferred until an attempted commit, i.e. when the address stops being buffered and attempts to become globally visible. In another embodiment, an explicit attribute, such as attribute 216w or 216r, is not set, as it is implied by definition in this example that a cache line is in a buffered state is read or write monitored.

In the examples above reference has been made to monitored buffered states; however, buffered unmonitored updates may also occur. For example, temporary or local values within a transaction that are not to be committed later may be updated in a buffered fashion without monitoring, since they do not become globally observed by their nature.

Typically, control logic 230 includes snoop logic, replacement logic, state logic, and other cache related logic to perform any known cache operations. For example, control logic is implements coherency protocols including protocols to support a buffered coherency state, which may also include transitions between MESIB states as discussed in more detail below in reference to FIG. 3. In one embodiment, control logic 230, either individually or in conjunction with other logic in processor 250, is to detect conflicts. As one example, a conflict includes an access conflict, such as an external access request to a line in a buffered state.

An external access, or non-local access, request includes an access associated with a processing element, which is not associated with the thread or transaction that caused a line to be buffered and/or monitored. For example, assume processing element 110a from FIG. 1 is associated with executing a transaction including a transactional store, which caused state entry 211 to be updated to a buffered state value. As a result, an access request from processing element 102a to cache line 210 includes an external access from the perspective of being external to thread 101a's execution. Consequently, it is important to note from this example that an external access request may include an access from a different thread executing on the same processor, not just an access request from a separate physical processor. In addition, where monitors are replicated on a per thread basis for shared caches, it is possible to detect external accesses at the thread level even within a shared cache.

Inversely, instead of an external access request being from a processing element not associated with the buffered or monitored state of a cache line, a local or internal access request includes an access request from the processing element associated with the buffered or monitored state of a cache line. Continuing the example, a transactional store within a transaction associated with processing element 110a caused entry 211 to be updated from a buffered value. Subsequently, a load operation from the same transaction associated with processing element 110a is to read from line 210. This load, which is to read the buffered data, is considered an internal access or local access from the perspective of both processing element 110a and the transaction.

An additional consideration in detecting conflicts may include a comparison of an external access type and a state of a hardware monitor. As an example, in response to a transactional store operation within a transaction, assume state entry 216 is set to a buffered state value to indicate cache line 215 is in a buffered state and that hardware attribute 216.w is set to indicate cache line 215 is write-monitored. When an external access request to line 215 is received/detected by control logic 230, a conflict is detected at the point of detecting the external access request. Here, the buffered store to line 215 is not to be globally observed until commit of the transaction, which results in a potential conflict, as the privately held data may be inconsistent with now potentially updated or shared global data. In other words, cache line 215 is in a write monitored buffered state, and as a result, line 215 may not be updated in parallel by external agents/processing elements.

In contrast, in one embodiment, a read monitored buffered line may be updated in parallel by multiple threads/processing elements, and conflicts, if any, are detected by control logic 230 through normal coherency protocols upon an attempted commit of the transaction. To illustrate, assume entry 211 holds a buffered state value to indicate that line 210 is associated with a buffered coherency state. Next, an external access request associated with cache line 210 is received. In this example, a conflict is not detected at this point. Instead, the transaction continues normal operation, and upon a commit of the transaction, data is to be transitioned to a globally observed state. In one example, which is described in more detail below, this transition includes a coherency state transition of line 210 from a buffered state to a modified coherency state. Note a transition of line 210 from a buffered state to a modified coherency state may include a two phase transition as described herein. However, control logic 230 to perform such a task generates a snoop message to indicate the intention to transition line 210 in that manner. At this point, other control logic in another cache for an external thread updating line 215 in parallel may detect a conflict based on line 215's coherency state transition in that cache. In other words, a read monitored buffered line conflict is, in this example, detected at an attempted acquisition of write monitoring in preparation to a commit action.

Control logic 230, either in conjunction with other control logic reporting logic or individually, may detect other types of conflicts or potential conflicts. For example, control logic 230, in one embodiment, detects a conflict upon loss of buffered data or hardware attribute information. Loss of data or attribute information may occur upon an eviction or other loss event, since buffered data and attribute information is local and potentially not written back to higher level memories upon eviction.

Control logic may also implement other protocols and perform other operations to support buffering of data. For example, control logic is to ensure buffered data is not globally observed to support an inherent property of transactional execution, i.e. that updated data is not globally observed until commit. Here, in one embodiment, control logic is to provide a miss-response to an external snoop request referencing the cache line and the cache line being associated with the buffered coherency state.

To illustrate, assume once again that line 215 is in a buffered coherency state, i.e. state entry 216 holds a buffered coherency state value. An external access request referencing an address associated with data item 201 and cache line 215 is received. Control logic 230, in response to line 215 being held in the buffered coherency state, provides a miss-response to the external agent making the request. Typically, a miss response includes a response to inform a requesting agent that the data is either not held in the cache or is in an invalid state. Yet, here cache line 215 holds an updated value for data item 201; however, the updated value is in a buffered state indicating the associated transaction has not committed. Consequently, the data is not forwarded to the external requesting agent to ensure proper transaction ordering and non-observation of data globally until commit of the transaction. The snoop response may be either a MISS or a new type of response, such as a HIT Buffered (HITB) response, which is similar to a HITM, except the response communicates the buffered state of the line instead of a modified state.

In one embodiment, control logic 230 may transition cache line 215 from being held in the buffered coherency state to an invalid coherency state in response to receiving the external access request associated with cache line 215 when the cache line is held in the buffered coherency state. As stated above, in one embodiment, when buffered line 215 is externally accessed, the data may have become stale, i.e. updated by the external requesting agent. Therefore, to ensure data consistency, in this example, in conjunction with providing the miss-response, line 215, if buffered and read monitored, is transitioned to an invalid state. As an example, state entry 216 is updated from a buffered state value to an invalid state value.

As another example of a protocol response, control logic 230 is to ensure that internally/locally buffered data is observable by local agents. To illustrate, a first thread executing a transaction includes a transactional store operation to data item 201 and a subsequent read of data item 201. In response to the transactional store operation, entries 211 and 216 are updated to a buffered coherency state to indicate data item 201 is held in a buffered state. To ensure internal sequential ordering, in response to the subsequent internal read request, control logic 230 provides the modified data item 201 to the local first thread. In other words, locally buffered data is provided to local reads, but not to external accesses.

In one embodiment, control logic 230 supports an efficient method for committing a transaction in hardware is provided. As an example, control logic 230 is to transition buffered cache lines associated with the transaction to a modified state. Essentially, the transition to a modified state indicates through a construct of the MESI protocol that the data held in the cache line has been modified by the processor, i.e. the data is globally observed. As an example, once in the modified state, an external access request to the cache line is provided a HITM response. To illustrate, assume a transactional store within a transaction is executed, which results in data item 201 being held in lines 210 and 215 in a buffered state. In response to either an implicit end to a transaction or an explicit end, such as execution of a user-level commit instruction, then lines 210 and 215 are transitioned from the buffered coherency state to the modified coherency state.

In one embodiment, a transition from a buffered coherency state to a modified coherency state includes a two-phase transition. Here, control logic 230 transition cache lines 210 and 215 from being associated with the buffered coherency state to an intermediate buffered-modified coherency state, i.e. updated entries 211 and 216 to intermediate buffered-modified coherency state values, and then clears the buffered state to leave the cache line associated with the modified state, i.e. clears the buffered value from the intermediate buffered-modified coherency value in entries 211 and 216 to leave a modified coherency value in entries 211 and 216.

As a further illustration, assume MESIB states are represented as the following: Invalid (0000), Shared (0001), Exclusive (0010), Modified (0100), and Buffered (1000). Inserting these representations into the example above results in the following: (1) control logic 230 transitions entries 211 and 216 from buffered values 1000 to an intermediate buffered-modified value of 1100 and then clears the buffered bit 1000 to leave the modified coherency value 0100 in entries 211 and 216. Here, control logic 230 includes logic, such as a circuit, to perform the two phase transition in response to a commit.

In one embodiment, control logic 230 is also capable of accessing coherency states in response to user-level instructions. For example, hardware of processor 250, such as decoders, may recognize user-instructions for accessing, manipulating, or reporting of buffered coherency states. Examples of such instructions include a set instruction, a clear instruction, or a test instruction. A set instruction, such as SetB.size Address, is to transition data starting at Address and ending at Address plus the size into a buffered state. To illustrate, a similar set instruction referencing a beginning address associated with data item 201 and a size of data element 201 transitions cache lines 210 and 215 holding data item 201 into a buffered state. Similarly, a test instruction is capable of reporting a coherency state associated with an address plus a size, while a clear instruction is capable of clearing a buffered coherency state from an address plus a size, i.e. transition to an invalid state.

Processor 250, as illustrated, includes register 250, which may include any known register, such as a control register or model specific register (MSR). Register 250, in one embodiment, is user-accessible to hold user-modifiable data. As one example, register 250 is to hold selection value information for determining if stores are to be buffered. Selection value information may include selective or non-selective values, as well as selection criteria. Determining if stores are to be buffered is discussed in more detail below in reference to FIG. 4.

Figure 3:
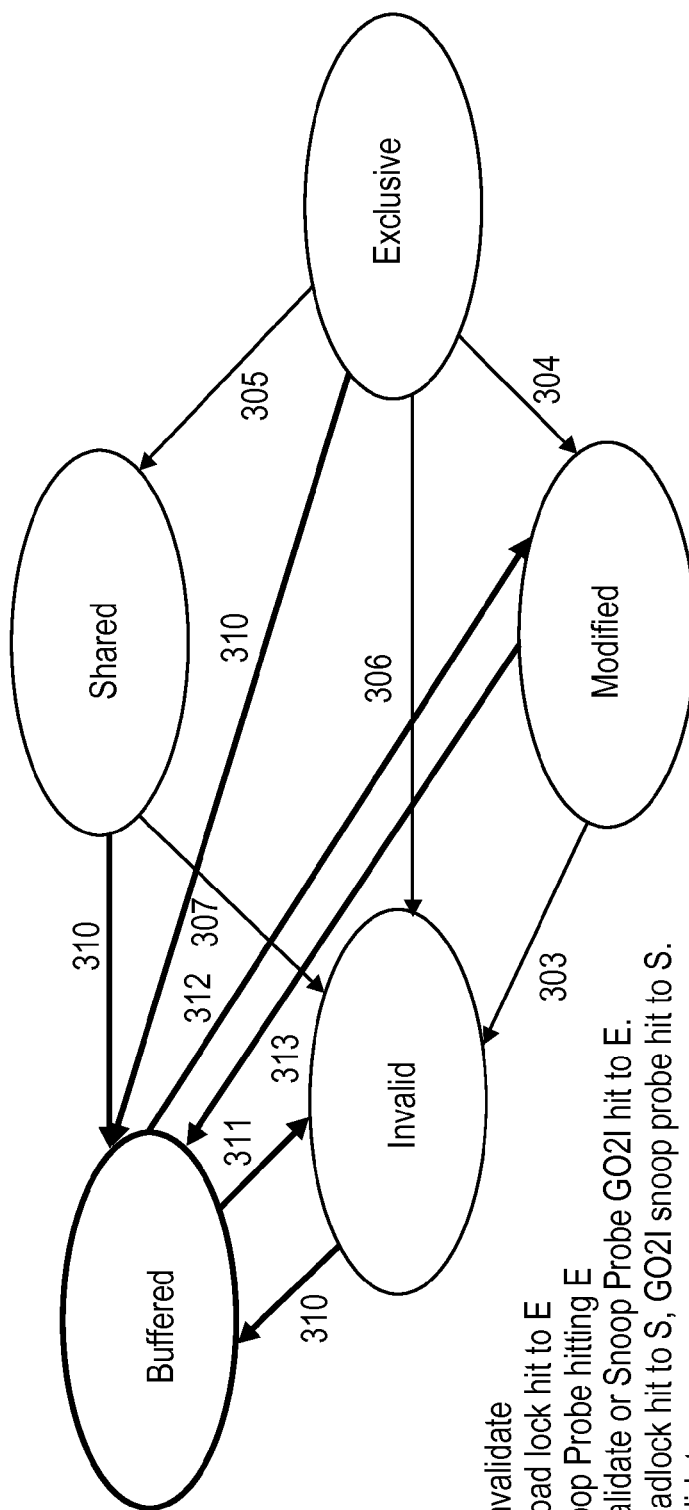
FIG. 3 illustrates an embodiment of a state transition diagram including a buffered state.

In reference to FIG. 3 an embodiment of a state transition diagram for MESI states including a buffered state is depicted. As stated above, control logic, such as control logic 230, illustrated in FIG. 2, in one embodiment, includes hardware logic, firmware, storage, and/or circuits to both represent the illustrated states and perform the transitions illustrated based on defined protocol responses to depicted events. Also note that the transition diagram of FIG. 3 may be modified to insert monitored and unmonitored states, such as a read monitored buffered state, a write monitored buffered state, an unmonitored buffered state, a read monitored shared state, or other states in an embodiment where read and write attributes are held in a state array. Examples of monitored and unmonitored MESI coherency states, not including a buffered state, are described in more detail in an application field herewith having Ser. No. 12/346,530, entitled "Read and Write Monitoring Attributes in Transactional Memory (TM) Systems," by Gad Sheaffer et al.

The buffered state is illustrated with some of the legacy transitions for the MESI protocol, such as store or load lock hit to exclusive 305 to transition from an Exclusive coherency state to a Modified coherency state. To avoid obscuring the discussion, transitions to and from the buffered state are the point of focus. Starting at the Invalid state, Shared state, or Exclusive state, a transactional store 210 to a line of memory transitions the line to a buffered state. Note that in another embodiment, any store selected for buffering may be equivalent to the transactional store, i.e. move the associated line to a buffered state. Selection of stores for buffering is described in more detail below in reference to FIG. 4. Similarly, when in the modified coherency state, a transactional store to a modified line moves the modified line to the buffered state.

Once a line is in a buffered state, then discard 311 is to transition the line to the Invalid state. As one example, discard 311 occurs in response to receiving an external write request to the line in the buffered state. A miss-response is provided to the external requesting agent, and the line is moved to the Invalid state in response to a discard operation. As another example, discard 311 occurs in response to an abort of the transaction including the transactional store, which was responsible for the transition to the buffered state in the first place. Alternatively, in response to commit 312, a line in the buffered state is transitioned to the Modified state. As stated above, the transition to the Modified state may include a two-phase transition.

Figure 4:
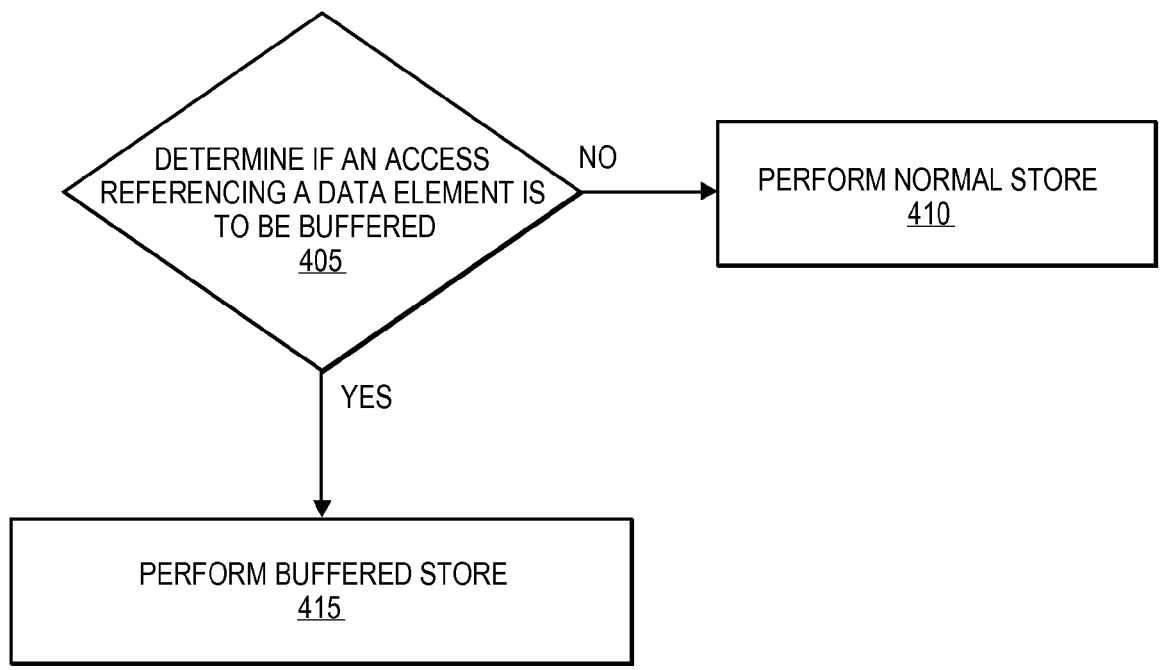
FIG. 4 illustrates an embodiment of a flow diagram for a method of determining if an access operation is to be buffered.
Figure 5:
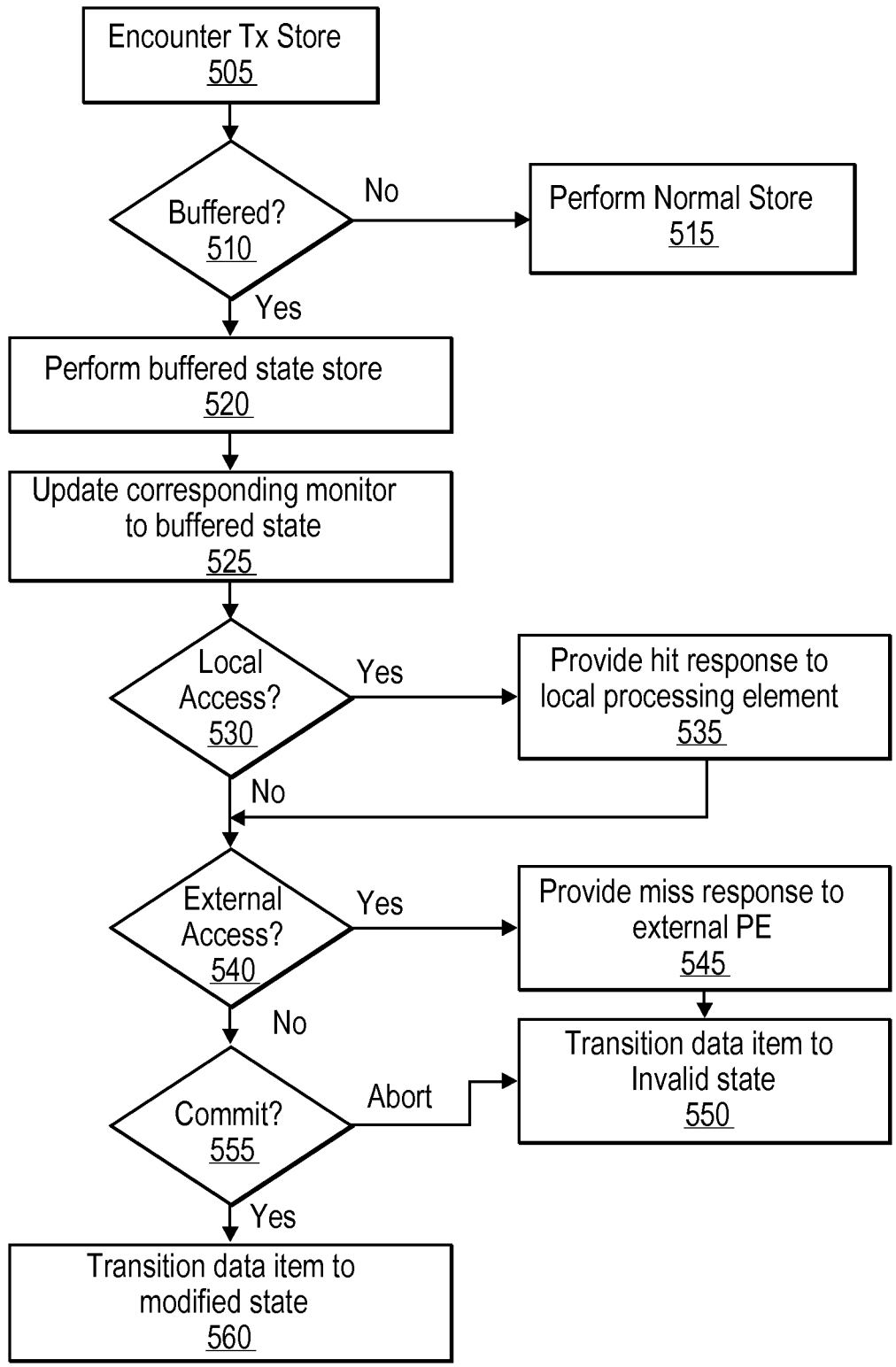
FIG. 5 illustrates an embodiment of a flow diagram for a method of supporting buffered data.

Turning to FIG. 4 an embodiment of a flow diagram for a method of determining if an access operation is to be buffered is illustrated. Note the flow diagrams of FIGS. 4 and 5 are illustrated in a substantially serial fashion. However, the methods illustrated by these Figures are not so limited, as they may occur in any order, as well as being performed at least partially in parallel.

In flow 405, it is determined if a memory access referencing a data element is to be buffered. In the most basic architectural sense, transactional store operations, in one embodiment, are to be buffered. Any known method for determining a transactional store operation is to be buffered may be utilized. For example, transactional stores may be identified by opcodes recognized by decoder logic of a processor. Essentially, a user utilizes a transactional store language operation. During compilation, this language is transformed into assembly code recognized by hardware of a processor as a transactional store to be buffered.

As another example, a mode of a processor or processing element may be set to indicate if stores are to be buffered. For example, upon a start of a transaction, a mode is updated to indicate transactional execution. Here, executed stores are not singled out by decoders as transaction, but rather based on the transactional mode of operation, the stores are buffered. Similarly, once committed, the mode may return to a default mode, where stores are not buffered or are selectively buffered based on selection criteria.

In one embodiment, multiple modes of buffering are provided, such as not buffering, non-selective buffering, and selective buffering. As an example, software is capable of setting a buffering mode. For example, a user instruction is capable of addressing a register, such as register 250 from FIG. 2, to indicate a mode of buffering. Software may determine which stores are to be buffered, such as transactional stores or other non-transactional stores. As an example, this determination may be made by software code, such as a compiler either statically or during runtime, application code, or a transactional runtime code. Here, a compiler potentially identifies a transactional store as a store to be buffered, such as through identification of a prefix to convert a regular store to a buffered store.

In one embodiment, a user-accessible control register, such as register 250 from FIG. 2, is to hold a selective value and potentially selection criteria when a processor is to operate in a selective mode. Similarly, register 250 is to hold a non-selective value to indicate a non-selective mode of operation. During a non-selective mode of buffering, all memory update operations are performed in a buffered fashion.

During a selective mode of buffering, in one embodiment, memory updates are buffered based on a specified criteria, which may be defined in any manner. Basing selection on criteria may be done in two ways, i.e. affirmative criteria or negative criteria. To illustrate, take a range of addresses, where selection for buffering may be performed in the negative, i.e. buffering not performed for operations unless the operation references an address that falls within the range of addresses, or in the negative, i.e. buffering performed for all operations except those that fall within the range of addresses. The criteria may be specified by a user in a user-accessible register, such as register 250, a privileged-level software accessible register, or a combination thereof.

A non-exhaustive exemplary list of selection criteria for memory accesses to memory addresses that may not be buffered include memory accesses to: virtual addresses falling within a range or matching a mask, physical addresses falling within a range or matching a mask, addresses belonging to specific memory types, address within a input/output (I/O) space, addresses executed in one protection domain on behalf of operations in another protection domain, address accessed by instructions identified by specific opcodes or prefixes, and specific data types, such as floating point or vector operations.

In addition, buffering may be performed in response to specific recognized instructions, such as only for transactional store operations that are identified by the user and recognizable by hardware of processor 250 or in response to special buffering instructions, such as the set, test, and clear instructions described above in reference to FIG. 2. Furthermore, other operations, such as access to a local stack, may be defaulted to non-buffered in some implementations.

Once it is determined if buffering is to be applied in flow 405, then buffering is either applied, i.e. a buffered store is performed, in flow 415 through associating the normal store with a buffered coherency state, or buffering is not performed in flow 410 and the store is performed normally.

With reference to FIG. 5 an embodiment of a flow diagram for a method of supporting buffered data is illustrated. In flow 505, a transactional store referencing an address associated with a data item is encountered. Encountering of an operation within a processor may include encountering the operation within any stage of the processor, such as a fetch, decode, execution, retire, or other stage.

In flow 510, it is determined if the transactional store is to be buffered. Determining if a store is to be buffered was discussed above in reference to FIG. 3. However, as a few examples of determining if a transactional store is to be buffered are provided. As a first example, decoder logic recognizes an opcode of the store to indicate the store is transactional. As another example, the processor is operating in a non-selective mode of buffering, where all store operations are performed in a buffered fashion. As yet another example, the processor may be operating in a selective mode of operation, and the transactional store either meets, or doesn't meet based on the implementation, specified selection criteria. If the store is not to be buffered, then it is performed as normal in flow 515.

However, if the store is to be buffered, then the transactional store is performed in a buffered fashion. As an example, the store is performed to a cache line, or a plurality of cache lines, and the associated coherency states are updated to a buffered state in flow 525 to indicate the data item is associated with a buffered coherency state. Note from the examples above, that a line may include only a portion of a data item. Yet, bounded monitoring provides buffering for the entire cache line if a portion is updated therein. In one embodiment, conflicts are detected utilizing implicit designations of a line in a buffered state. However, in another embodiment, a monitor associated with the referenced data item is set to indicate the data item is buffered in flow 525.

In flow 530, it is determined if a local access is made to the address associated with the data item. As stated above, a local access may include an access from the thread that executed the transactional store causing the transition to the buffered state or from a transaction including the transactional store. In response to receiving a local access, a hit response is provided to the local requesting agent in flow 535. In other words, from the perspective of the local agent, the recently modified data is provided to ensure sequential ordering within local execution.

However, in flow 540, if an external access is detected, then a miss response is provided to the external requesting agent in flow 545. Essentially, the buffered data is visible to local agents, but not external global agents, which provides the proper support for transactional execution in an efficient manner utilizing buffered data. Furthermore, in one embodiment, the buffered data item is transitioned to an invalid state in response to the external access request to ensure global data consistency.

In flow 555, it is determined if the transaction is to commit. As stated above, a read monitored buffered line may detect a conflict at an attempted commit, i.e. an attempted transition from a buffered state to a modified state based on coherency protocols. Therefore, if the transaction is to abort, then in flow 550 the data item is transitioned to the invalid state to discard the data item, such that external agents to not observe the now invalid data item. However, if the transaction is to be committed, then in flow 560, the data item is transitioned to a modified state. In one embodiment, the transition from a buffered state to a modified state includes a two-phase transition, i.e. a first transition from the buffered state to a buffered-modified state and a second transition from the buffered-modified state to the modified state.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
    a processor including a memory comprising a line to hold at least a portion of a data item in a buffered state in response to the data item being transactionally written,
    control logic coupled to the memory to provide a hit response responsive to a local access request to the line in the buffered state and to provide a miss responsive to a non-local access request to the line in the buffered state; and
    an input/output (I/O) device coupled to the processor, wherein:
        the control logic is further to transition the line from the buffered state to an invalid state responsive to the non-local access request to the line in the buffered state; and
        the control logic is further to transition the line from the buffered state to a modified state responsive to perform a commit operation for the line.

2. The system of claim 1, wherein the processor further comprises a hardware write monitor to be set to indicate the line is write monitored in response to the data item being transactionally written and a hardware read monitor to be set to indicate the line is read monitored in response to the data item being transactionally read.

3. An apparatus comprising:
    execution resources to execute a transactional store operation within a transaction referencing an address associated with a data item, wherein the transaction includes a grouping of instructions, operations or micro-operations to be executed as an atomic group; and
    a cache memory coupled to the execution resources to hold the data item in a buffered coherency state in response to the execution resources executing the transactional store operation; and
    control logic associated with the cache memory to transition a cache line from being associated with the buffered coherency state to a modified coherency state responsive to the transaction being committed, wherein the cache line to be associated with the buffered coherency state comprises a state entry associated with the cache line holding a buffered state value to indicate the cache line is held in the buffered coherency state.

4. The apparatus of claim 3, wherein the the cache memory comprises a cache line, which is to hold at least a portion of the data item, to be associated with the buffered coherency state.

5. The apparatus of claim 3, wherein a hardware monitor associated with the cache line is also to indicate the cache line buffered in response to the execution resources executing the transactional store operation.

6. The apparatus of claim 5, wherein the control logic is to detect a conflict at the time of an external access request in response to the control logic receiving the external access request and the hardware monitor indicating the cache line is buffered.

7. The apparatus of claim 3, wherein a hardware read monitor associated with the cache line is also to indicate the cache line is read-monitored in response to the execution resources executing a local transactional read operation within the transaction.

8. The apparatus of claim 3, wherein the control logic is to provide a missresponse responsive to the control logic receiving an external access request referencing the cache line and the cache line being associated with the buffered coherency state.

9. The apparatus of claim 8, wherein the control logic is to provide a hit-response responsive to the control logic receiving a local access request referencing the cache line and the cache line being associated with the buffered coherency state.

10. The apparatus of claim 3, wherein the control logic is to transition the cache line from being associated with the buffered coherency state to a modified coherency state comprises the control logic to directly transition the cache line from being associated with the buffered coherency state to being associated with the modified coherency state.

11. The apparatus of claim 3, wherein the control logic is to transition the cache line from being associated with the buffered coherency state to a modified coherency state comprises the control logic to transition the cache line from being associated with the buffered coherency state to an intermediate buffered-modified coherency state and then clearing the buffered state to leave the cache line associated with the modified coherency state.

12. The apparatus of claim 3, wherein the control logic is capable of accessing the buffered coherency state to be associated with the cache line responsive to a user-level instruction, and wherein the user-level instruction is selected from a group consisting of a set coherency state instruction, a clear coherency state instruction, and a test coherency state instruction.

13. A processor comprising:
a cache memory to hold at least a portion of a data item in a cache line to be held in a buffered coherency state in response to performing a store operation, which is to reference the data item and is to be selected for buffering, wherein a coherency state entry is to be associated with the cache line, wherein the cache line to be held in the buffered coherency state includes the state entry holding a buffered coherency value; and
control logic associated with the cache memory to provide a miss response in response to receiving an external access request associated with the cache line when the cache line is held in the buffered coherency state, wherein the control logic is further to transition the cache line from being held in the buffered coherency state to an invalid coherency state in response to receiving the external access request associated with the cache line when the cache line is held in the buffered coherency state.

14. The processor of claim 13, further comprising a first processing element to be associated with the store operation and a second processing element not associated with the store operation, wherein the external access request associated with the cache line includes an access request to access the data item associated with the second processing element.

15. The processor of claim 13, further comprising decoder logic, wherein the store operation to be selected for buffering comprises the decoder logic to recognize the store operation as including a transactional store operation to be selected for buffering.

16. The processor of claim 13, further comprising a user-accessible control register to hold a selective value to indicate a selective mode of buffering and a non-selective value to indicate a non-selective mode of buffering.

17. The processor of claim 16, wherein the store operation to be selected for buffering comprises the user-accessible control register holding the selective value and a criteria associated with the store operation matching a selection criteria or the user accessible control register holding the non-selective value.

18. An apparatus comprising:
a cache memory to hold at least a portion of a data item in a cache line to be associated with a buffered coherency state in response to the data item being transactionally accessed within a transaction; and
control logic associated with the cache memory to transition the cache line from being associated with the buffered coherency state to a modified coherency state in response to the transaction being committed, wherein:
the cache line to be associated with a buffered coherency state comprises a coherency entry associated with the cache line to hold a buffered coherency value; and
the control logic to transition the cache line from being associated with the buffered coherency state to a modified coherency state comprises updating the coherency entry from holding the buffered coherency value to hold a modified coherency state.

19. The apparatus of claim 18, wherein the transaction being committed is in response to execution of a user-level commit transaction instruction.

20. The apparatus of claim 18, wherein the transaction being committed is in response to reaching the end of the transaction while not detecting any transaction related conflicts.

21. The apparatus of claim 18, wherein updating the coherency entry from holding the buffered coherency value to hold a modified coherency value comprises updating the coherency entry from holding the buffered coherency value to hold a buffered-modified intermediate coherency value and then clearing the buffered coherency value from the buffered-modified intermediate coherency value to form the modified coherency value.

22. The apparatus of claim 21, wherein the coherency entry includes a bit vector, and wherein updating the coherency entry from holding the buffered coherency value to hold a buffered-modified intermediate coherency value and then clearing the buffered coherency value from the buffered-modified intermediate coherency value to leave the modified coherency value comprises setting a modified bit of the coherency entry to update the coherency entry from holding the buffered coherency value to hold the buffered-modified intermediate coherency value and then clearing a buffered bit of the coherency entry to leave the modified bit set for the modified coherency value.

23. A method comprising:
encountering a transactional store referencing an address associated with a data item, wherein the transactional store is a part of a transaction that includes a grouping of instructions, operations or micro-operations to be executed as an atomic group;
performing a buffered store of the data item to associate the data item with a buffered state in response to encountering the transactional store by performing a buffered store of at least a portion of the data item to a cache line in a cache memory associated with the address associated with the data item and updating a coherency state entry corresponding to the cache line to a buffered state value to associate at least the portion of the data item held in the cache line with the buffered state; and
in response to the data item being associated with the buffered state, providing a hit response to a local access to the data item and providing a miss response to an external access to the data item and updating the coherency state entry to an invalid state value to associate at least the portion of the data item held in the cache line with an invalid state in response to the data item being associated with the buffered state and providing a miss response to the external access to the data item.

24. The method of claim 23, wherein the transactional store referencing the address includes an operation code (opcode) recognizable by decoder logic of a processor to indicate the transactional store is to be performed as a buffered store.

25. The method of claim 23, further comprising updating a write monitor associated with the cache line to a monitored state to indicate the cache line is write monitored in response to performing the buffered store of at least the portion of the data item to the cache line.

26. The method of claim 23, further comprising updating the coherency state entry to a modified state value to associate at least the portion of the data item held in the cache line with a modified state in response to the data item being associated with the buffered state and performing a commit associated with the data item.

27. The method of claim 23, wherein updating the coherency state entry to a modified state value to associate at least the portion of the data item held in the cache line with a modified state comprises updating the coherency state entry to a modified-buffered state value and then clearing the buffered state value from the modified-buffered state value to leave the modified state value.

* * * * *